United States Patent
Eto et al.

(10) Patent No.: US 11,443,219 B2
(45) Date of Patent: Sep. 13, 2022

(54) MODEL ESTIMATION SYSTEM, METHOD, AND PROGRAM

(71) Applicant: NEC CORPORATION, Tokyo (JP)

(72) Inventors: Riki Eto, Tokyo (JP); Yoshio Kameda, Tokyo (JP)

(73) Assignee: NEC CORPORATION, Tokyo (JP)

(*) Notice: Subject to any disclaimer, the term of this patent is extended or adjusted under 35 U.S.C. 154(b) by 642 days.

(21) Appl. No.: 16/481,715

(22) PCT Filed: Jan. 18, 2018

(86) PCT No.: PCT/JP2018/001399
§ 371 (c)(1),
(2) Date: Jul. 29, 2019

(87) PCT Pub. No.: WO2018/150798
PCT Pub. Date: Aug. 23, 2018

(65) Prior Publication Data
US 2020/0027013 A1  Jan. 23, 2020

(30) Foreign Application Priority Data
Feb. 17, 2017 (JP) .............................. JP2017-027724

(51) Int. Cl.
G06N 7/00 (2006.01)
G06F 30/20 (2020.01)
(Continued)

(52) U.S. Cl.
CPC ............... *G06N 7/00* (2013.01); *G06F 30/20* (2020.01); *G06N 20/00* (2019.01); *G06F 17/13* (2013.01); *G06F 17/16* (2013.01); *G06F 2111/10* (2020.01)

(58) Field of Classification Search
CPC .......... G06N 7/00; G06N 20/00; G06F 30/20; G06F 2111/10; G06F 17/13; G06F 17/16
See application file for complete search history.

(56) References Cited

U.S. PATENT DOCUMENTS

2012/0226726 A1* 9/2012 Pimentel ............... G06F 30/327
708/270

FOREIGN PATENT DOCUMENTS

JP    09-81204 A     3/1997
JP    11-282506 A    10/1999
(Continued)

OTHER PUBLICATIONS

Jin L, Zhang Y. Discrete-time Zhang neural network of O (τ3) pattern for time-varying matrix pseudoinversion with application to manipulator motion generation. Neurocomputing. Oct. 22, 2014;142:165-73. (Year: 2014).*

(Continued)

*Primary Examiner* — Chuen-Meei Gan
(74) *Attorney, Agent, or Firm* — Sughrue Mion, PLLC

(57) ABSTRACT

A model estimation system estimates a model of a system represented by an ordinary differential equation with all coefficients being non-zero, and with which input data and a state at each time can be obtained. When an order of the ordinary differential equation and input data and a state at multiple past times in the system are inputted, a model expression construction unit constructs an expression representing a model by using a first matrix that is a matrix according to the order and has only some elements as unknown elements and a second matrix that is a matrix according to the order and has only some one element as an unknown element. A model estimation unit uses input data and a state at multiple past times, to estimate the model by learning unknown elements of the first matrix and the unknown element of the second matrix.

6 Claims, 4 Drawing Sheets

(51) Int. Cl.
*G06N 20/00* (2019.01)
*G06F 111/10* (2020.01)
*G06F 17/13* (2006.01)
*G06F 17/16* (2006.01)

(56) References Cited

FOREIGN PATENT DOCUMENTS

| | | |
|---|---|---|
| JP | 2008-040660 A | 2/2008 |
| JP | 2008-287344 A | 11/2008 |
| JP | 2013-242614 A | 12/2013 |

OTHER PUBLICATIONS

International Search Report of PCT/JP2018/001399 dated Apr. 10, 2018 [PCT/ISA/210].

* cited by examiner

MODEL ESTIMATION SYSTEM, METHOD, AND PROGRAM

CROSS REFERENCE TO RELATED APPLICATIONS

This application is a National Stage of International Application No. PCT/JP2018/001399, filed Jan. 18, 2018, claiming priority based on Japanese Patent Application No. 2017-027724, filed Feb. 17, 2017, the contents of all of which are incorporated herein by reference in their entirety.

TECHNICAL FIELD

The present invention relates to a model estimation system, a model estimation method, and a model estimation program for estimating a model of a system.

BACKGROUND ART

In recent years, with the progress of information collection infrastructure of physical systems such as internet of things (IoT) and machine to machine (M2M), control of physical systems is becoming more important. However, modeling of complex physical systems (in other words, estimation of models of physical systems) is difficult for even experts.

Dynamic systems such as physical systems can be described by a state space model. As a technique for estimating a state space model by using measurement data obtained from a physical system, there is system identification.

Further, the state space model has an advantage that linear control optimization methods are applicable.

In the following description, a description is given to a case where a model of a system is a discrete time state space model. Meanwhile, as a type of a model of the system, there is also a discrete time linear parameter-varying model.

The discrete time state space model is a model that can calculate a state of the system at a next time from a state of the system at a certain time, with a constant time interval.

The physical system to be modeled is described as a target system. In a case of modeling the target system with the discrete time state space model, the target system can be modeled as long as input data and output data of the target system have been obtained.

The discrete time state space model is represented as shown in the following Expression (1).

[Formula 1]

$$\begin{cases} x_{k+1} = Ax_k + Bu_k + w_k \\ y_k = Cx_k + v_k \end{cases} \quad (1)$$

In Expression (1), u is a variable representing input data to the target system, and y is a variable representing output data from the target system. Further, x is a state variable representing a state of the target system. w is a variable representing a prediction error of a state, and v is a variable representing a prediction error of the output data. "k" and "k+1" added as suffixes to u, y, x, w, and v represent a time. For example, $u_k$ is input data at a time k.

In addition, PTL 1 describes that a parameter is identified by obtaining a parameter that minimizes an objective function.

Further, PTL 2 describes that, when a system is represented by an n-th differential equation, and a parameter of the n-th differential equation is unknown, the parameter is identified.

CITATION LIST

Patent Literature

PTL 1: Japanese Patent Application Laid-Open No. 2013-242614

PTL 2: Japanese Patent Application Laid-Open No. H9-81204

SUMMARY OF INVENTION

Technical Problem

In general, in a case of modeling a target system with a discrete time state space model, attention has been focused on whether or not the discrete time state space model can accurately predict a behavior of the target system (prediction accuracy). However, in general, in a case of modeling a target system with a discrete time state space model, consideration has not been given to whether or not the discrete time state space model obtained by modeling has controllability. Controllability is, when an initial state and a target state are given, the ability to transition from the initial state to the target state.

As described above, in general, in modeling a target system, consideration has not been given to whether or not the obtained discrete time state space model has controllability. Therefore, there has been a case where the discrete time state space model obtained by modeling the target system has no controllability. If the discrete time state space model has no controllability, a case may also occur in which control of the target system based on the discrete time state space model cannot be performed.

Accordingly, it is an object of the present invention to provide a model estimation system, a model estimation method, and a model estimation program capable of estimating a discrete time state space model having controllability.

Solution to Problem

The model estimation system according to the present invention is a model estimation system for estimating a model of a system that is represented by an ordinary differential equation with all coefficients being non-zero and with which input data and a state at each time can be obtained. The model estimation system includes: a model expression construction means to construct an expression representing a model for predicting a state of the system at a next time from input data and a state of the system at one time, when an order of the ordinary differential equation and input data and a state at multiple past times in the system are inputted, by using a first matrix that is a matrix according to the order and has only some elements as unknown elements and a second matrix that is a matrix according to the order and has only some element as an unknown element; and a model estimation means to estimate the model by learning unknown elements of the first matrix and an unknown element of the second matrix in the expression by using input data and a state at multiple past times.

Further, the model estimation method according to the present invention is a model estimation method for estimating a model of a system that is represented by an ordinary differential equation with all coefficients being non-zero and with which input data and a state at each time can be obtained. In the model estimation method, a computer: constructs an expression representing a model for predicting a state of the system at a next time from input data and a state of the system at one time, when an order of the ordinary differential equation and input data and a state at multiple past times in the system are inputted, by using a first matrix that is a matrix according to the order and has only some elements as unknown elements and a second matrix that is a matrix according to the order and has only some element as an unknown element; and estimates the model by learning unknown elements of the first matrix and an unknown element of the second matrix in the expression by using input data and a state at multiple past times.

Further, the model estimation program according to the present invention is a model estimation program for causing a computer to estimate a model of a system that is represented by an ordinary differential equation with all coefficients being non-zero and with which input data and a state at each time can be obtained. The model estimation program causes a computer to execute: a model expression construction process of constructing an expression representing a model for predicting a state of the system at a next time from input data and a state of the system at one time, when an order of the ordinary differential equation and input data and a state at multiple past times in the system are inputted, by using a first matrix that is a matrix according to the order and has only some elements as unknown elements and a second matrix that is a matrix according to the order and has only some element as an unknown element; and a model estimation process of estimating a model by learning unknown elements of the first matrix and an unknown element of the second matrix in the expression by using input data and a state at multiple past times.

Advantageous Effects of Invention

According to the present invention, it is possible to estimate a discrete time state space model having controllability.

DESCRIPTION OF EMBODIMENTS

In the following description, first, a description is given to findings obtained by the inventor of the present invention (hereinafter, simply referred to as the inventor), and then an exemplary embodiment of the present invention will be described.

Further, in the following description, a state of a target system (physical system to be modeled) is an array of a plurality of observation amounts. Specifically, a state of the target system is an array of a certain observation amount (defined as y) and a first order differential of y to an n-th order differential of y. That is, a state $x_k$ of the target system at a time k is to be represented by Expression (2) shown below.

$$x_k = [y_k, y_k^{(1)}, \ldots, y_k^{(n)}]^T \quad (2)$$

Note that notation in superscript parenthesis indicates a differential order. This also applies to other expressions described later. Further, T represents transposition.

In addition, not only the observation amount y, each value of the first order differential to the n-th order differential of the observation amount y can also be observed. This means that the state $x_k$ represented by Expression (2) can be treated as output data. In a case where a state can be treated as output data, $y_k = Cx_k + v_k$ can be neglected in Expression (1) representing a discrete time state space model. That is, when a state of the target system is an array of the observation amount y and a first order differential of y to the n-th order differential of y, and the state is treated as output data, the discrete time state space model is represented by the following Expression (3).

$$x_{k+1} = Ax_k + Bu_k + w_k \quad (3)$$

Expression (3) is obtained by neglecting $y_k = Cx_k + v_k$ in Expression (1). Further, A and B each are matrices.

Figure 1:
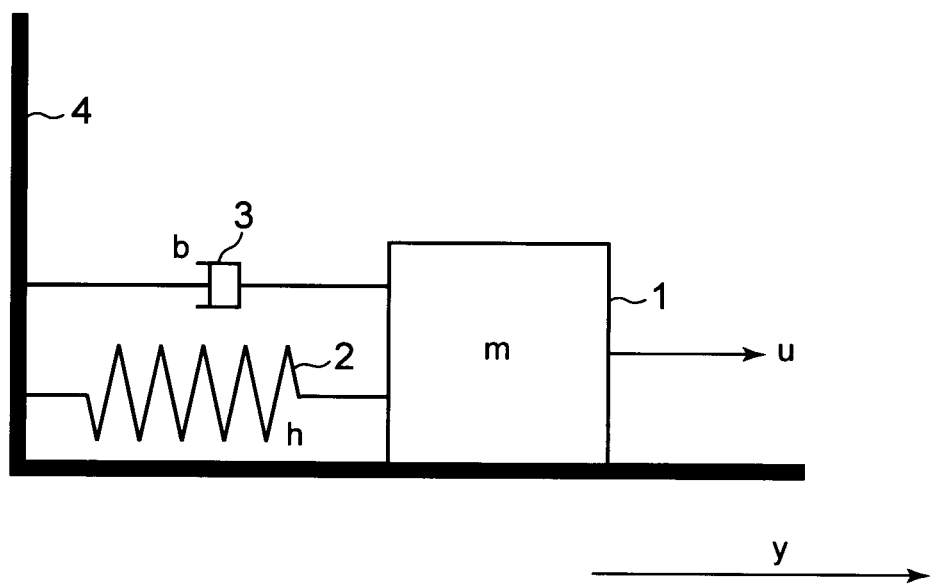
FIG. 1 It depicts a schematic view showing an example of a target system.

Moreover, the inventor has considered the system shown in FIG. 1 as an example of a target system. In the system shown in FIG. 1, an object 1 is connected to a wall 4 by a spring 2 and a damper 3 arranged in parallel. Mass of the object 1 is defined as m. A spring constant of the spring 2 is defined as h. A damping coefficient of the damper 3 is defined as b. A force applied to the object 1 is defined as u. Further, a position of the object 1 is defined as the observation amount y. At this time, the first order differential of y is a speed of the object 1, and the second order differential of y is an acceleration of the object 1. A position, a speed, and an acceleration are all observable. Then, a state of the system shown in FIG. 1 is to be represented by a combination of the position, the speed, and the acceleration. The system shown in FIG. 1 can be represented by the expression shown in Expression (4).

$$my(t)^{(2)} + by(t)^{(1)} + hy(t) = u(t) \quad (4)$$

Note that it is known that any of m, b, and h is non-zero. Further, each of the values themselves of m, b, and h is unknown.

t in Expression (4) represents a time in a continuous time period. When the time in Expression (4) is discretized, it can be represented as Expression (5).

$$my_{k+1}^{(2)} = -hy_k - by_k^{(1)} + u_k \quad (5)$$

Expression (4) is a second order differential equation. In this case, with a matrix A in Expression (3) being a matrix of three rows and three columns, and a matrix B in Expression (3) being a matrix of three rows and one column, the discrete time state space model of the system shown in FIG. 1 can be represented as Expression (6).

$$x_{k+1} = Ax_k + Bu_k \quad (6)$$

Note that Expression (6) shows an ideal case where there is no prediction error $w_k$ of the state.

The discrete time state space model of the system shown in FIG. 1 can be estimated by estimating all elements of the matrices A and B of Expression (6), by machine learning (for example, regression analysis) using a state and input data of each time observed from the system shown in FIG. 1. Then, with the discrete time state space model obtained by the machine learning, a state of the next time can be obtained from a state and input data at a certain time.

Here, the inventor has studied on expressing each of the matrices A and B as a matrix in which only some element is unknown, and estimating the only some element by machine learning, rather than estimating all elements of the matrices A and B. As a result, the inventor has found that Expression (6) can be represented by the following Expression (7). That is, the inventor has found that, with only some element being unknown among the elements of matrix A and elements of matrix B, other elements can be determined at a time before the machine learning is performed.

[Formula 2]

$$\underbrace{\begin{bmatrix} y_{k+1} \\ y_{k+1}^{(1)} \\ y_{k+1}^{(2)} \end{bmatrix}}_{x_{k+1}} = \underbrace{\begin{bmatrix} 1 & \Delta t & 0 \\ 0 & 1 & \Delta t \\ -h/m & -b/m & 0 \end{bmatrix}}_{A} \underbrace{\begin{bmatrix} y_k \\ y_k^{(1)} \\ y_k^{(2)} \end{bmatrix}}_{x_k} + \underbrace{\begin{bmatrix} 0 \\ 0 \\ 1/m \end{bmatrix}}_{B} u_k \quad (7)$$

In Expression (7), $\Delta t$ is a constant indicating a time period from one time to the next time.

Further, the number when the rows of the matrix are counted from the top is to be represented as i.

In the matrix A, in each row other than i=3, an i-th element from the left can be set to 1 and an (i+1)-th element from the left can be set to $\Delta t$, and remaining elements can be set to 0. Further, in the last line (line where i=3), a first element from the left can be set to an unknown element "$-h/m$", a second element from the left can be set to an unknown element "$-b/m$", and a third element from the left can be set to 0. Moreover, in the matrix B, an element of each row other than i=3 can be set to 0. Further, an element of the last line can be set to an unknown element "$1/m$". The inventor has found these points and found that the discrete time state space model of the system shown in FIG. 1 can be represented in a form shown in Expression (7).

Then, the inventor has found that it is sufficient to estimate values of unknown elements "$-h/m$" and "$-b/m$" in matrix A and a value of unknown element "$1/m$" in matrix B by machine learning, and it is not necessary to estimate values of all the elements of matrices A and B by machine learning.

Furthermore, the inventor has made a study similar to the above by generalizing the differential equation representing the target system to an n-th order ordinary differential equation.

The target system is to be represented by an n-th order ordinary differential equation shown in the following Expression (8).

[Formula 3]

$$a_n \frac{d^n}{dt^n} y(t) + a_{n-1} \frac{d^{n-1}}{dt^{n-1}} y(t) + \ldots + a_0 y(t) = u(t) \quad (8)$$

Note that it is known that any of all the coefficients $a_0$ to $a_n$ shown in Expression (8) is non-zero. Further, each of the values of all the coefficients $a_0$ to $a_n$ themselves shown in Expression (8) is unknown.

In Expression (8), t represents a time in a continuous time period. If the time in Expression (8) is discretized and the discrete time state space model of the target system represented by Expression (8) is represented, it can be represented as Expression (9) shown below.

$$x_{k+1} = Ax_k + Bu_k \quad (9)$$

Note that, in Expression (9), the matrix A is a matrix of n+1 rows and n+1 columns, and the matrix B is a matrix of n+1 rows and one column. Further, a state of the target system is represented by a combination of a certain observation amount y and a first order differential to an n-th order differential of the observation amount. In addition, all of the first order differential to the n-th order differential of the observation amount are observable.

Further, Expression (9) shows an ideal case where there is no prediction error $w_k$ of the state.

The inventor has found that Expression (9) can be represented as Expression (10) shown below.

[Formula 4]

$$\underbrace{\begin{bmatrix} y_{k+1} \\ y_{k+1}^{(1)} \\ \vdots \\ y_{k+1}^{(n-1)} \\ y_{k+1}^{(n)} \end{bmatrix}}_{x_{k+1}} = \underbrace{\begin{bmatrix} 1 & \Delta t & 0 & \ldots & 0 \\ 0 & 1 & \Delta t & \ldots & 0 \\ 0 & 0 & \ddots & \ddots & 0 \\ 0 & 0 & 0 & 1 & \Delta t \\ b_0 & b_1 & \ldots & b_{n-1} & 0 \end{bmatrix}}_{A} \underbrace{\begin{bmatrix} y_{k+1} \\ y_k^{(1)} \\ \vdots \\ y_k^{(n-1)} \\ y_k^{(n)} \end{bmatrix}}_{x_k} + \underbrace{\begin{bmatrix} 0 \\ 0 \\ \vdots \\ 0 \\ c_n \end{bmatrix}}_{B} u_k \quad (10)$$

In Expression (10), $\Delta t$ is a constant indicating a time period from one time to the next time.

Further, as described above, the number when the rows of the matrix are counted from the top is to be represented as i.

The inventor has found that, in the matrix A, in each row other than i=n+1 (that is, each row other than the last row), an i-th element from the left can be set to 1, an (i+1)-th element from the left can be set to $\Delta t$, and remaining elements can be set to 0 (see Expression (10)). For example, in the first row (i=1), a first element from the left can be set to 1, a second element from the left can be set to $\Delta t$, and remaining elements can be set to 0. Further, the inventor has found that, in the last row (i=n+1) of the matrix A, an i-th (that is, the (n+1)-th) element from the left can be set to 0 and remaining elements can be set to unknown elements $b_0$ to $b_{n-1}$ (see Expression (10)).

Further, the inventor has found that, in the matrix B, an element of the last row (i=n+1) can be set to an unknown element $c_n$, and an element of each of all the other rows can be set to 0 (see Expression (10)).

Here, in Expression (10), the unknown elements $b_0$ to $b_{n-1}$ and $c_n$ are represented by coefficients $a_0$ to $a_n$ in the n-th order ordinary differential equation shown in Expression (8).

Then, the inventor has found that, as long as a form of the discrete time state space model has been defined as shown in Expression (10) before machine learning, it is sufficient to estimate values of only the unknown elements $b_0$ to $b_{n-1}$ and $c_n$, and it is not necessary to estimate values of all the elements of matrices A and B by machine learning. Then, with the discrete time state space model obtained by estimating values of the unknown elements $b_0$ to $b_{n-1}$ and $c_n$, it is possible to obtain a state of a next time from a state and input data at a certain time.

Furthermore, the inventor has studied how the controllable matrix of the discrete time state space model represented by Expression (10) is represented. Note that the controllable matrix is a matrix to be used to determine whether or not the model has controllability. When a determinant of the controllable matrix is non-zero, the model has controllability. Further, when the determinant of the controllable matrix is 0, the model has no controllability. Hereinafter, the controllable matrix is represented as $C_0$.

In general, assuming that the matrix A in the discrete time state space model is a matrix of N rows and N columns, the controllable matrix $C_0$ is represented as shown in the following Expression (11).

$$C_0 = [B\ AB\ \ldots\ A_{N-1}B] \quad (11)$$

In the discrete time state space model shown in Expression (10), the matrix A is a matrix of n+1 rows and n+1 columns. Therefore, the controllable matrix $C_0$ of the discrete time state space model shown in Expression (10) is represented as Expression (12) shown below.

$$C_0 = [B\ AB\ \ldots\ A^n B] \quad (12)$$

In Expression (12), n is an order of the ordinary differential equation (see Expression (8)) representing the target system. Further, the controllable matrix $C_0$ shown by Expression (12) is a matrix of n+1 rows and n+1 columns.

Figure 2:
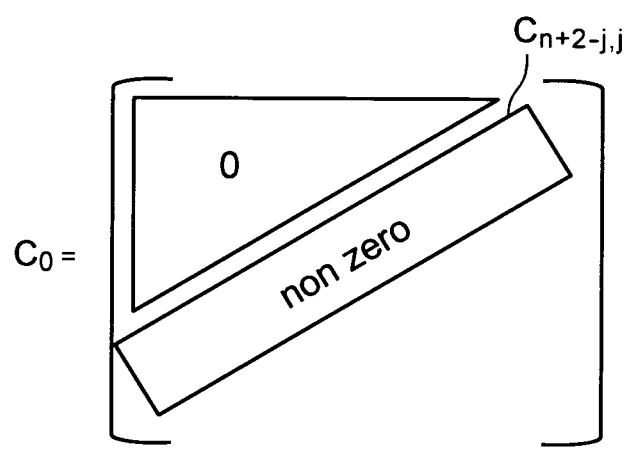
FIG. 2 It depicts a schematic view showing a form of a controllable matrix of a discrete time state space model shown in Expression (10).

Furthermore, the inventor has found that, when the controllable matrix $C_0$ of the discrete time state space model shown in Expression (10) is calculated, the controllable matrix $C_0$ has a form shown in FIG. 2. FIG. 2 is a schematic view showing a form of the controllable matrix $C_0$ of the discrete time state space model shown in Expression (10). As described above, i represents the number when the rows of the matrix are counted from the top. $1 \leq i \leq n+1$ is satisfied. Further, elements of a p-th row and a q-th column of the matrix are represented as $c_{p,q}$. Further, the number when the columns of the matrix are counted from the left is defined as j. j takes an integer value of 1 to n+1. The inventor has found that, in the controllable matrix $C_0$ of the discrete time state space model shown in Expression (10), a value of the element $c_{n+2-j,j}$ never becomes 0. That is, the inventor has found that n+1 pieces of elements of $c_{n+1,1}$, $c_{n,2}$, $c_{n-1,3}$, ..., $c_{1,n+1}$ among the elements of the controllable matrix $C_0$ of the discrete time state space model shown in Expression (10) never become 0. The n+1 pieces of elements of $c_{n+1,1}$, $c_{n,2}$, $c_{n-1,3}$, ..., $c_{1,n+1}$ are elements aligned obliquely from a bottom left element to a top right element of the controllable matrix $C_0$.

The fact that the n+1 pieces of elements of $c_{n+1,1}$, $c_{n,2}$, $c_{n-1,3}$, ..., $c_{1,n+1}$ never become 0 can be derived from that any of all the coefficients $a_0$ to $a_n$ shown in Expression (8) is non-zero, and that the unknown elements $b_0$ to $b_{n-1}$ and $c_n$ shown in Expression (10) are represented by the coefficients $a_0$ to $a_n$.

Furthermore, the inventor has found that, in the j-th column, elements arranged above the (n+2-j)-th row are always 0. For example, in the first column, elements arranged above $c_{n+1,1}$ (that is, elements from the first row to the n-th row) are always 0. Further, for example, in the second column, elements arranged above $c_{n,2}$ (that is, elements from the first row to the (n-1)-th row) are always 0. Note that, in the (n+1)-th column, there is no element arranged above $c_{1,n+1}$.

In other words, the inventor has found that each element arranged in a triangle shape above elements ($c_{n+1,1}$, $c_{n,2}$, $c_{n-1,3}$, ..., $c_{1,n+1}$) that are aligned obliquely from the bottom left element to the top right element of the controllable matrix $C_0$ is always 0 (see FIG. 2).

Furthermore, the inventor has found that the determinant of the controllable matrix $C_0$ as described above never becomes 0 in light of Sarrus' rule.

The fact that the determinant of the controllable matrix $C_0$ of the discrete time state space model shown in Expression (10) never becomes 0 means that the discrete time state space model shown in Expression (10) has controllability.

That is, the inventor has found that the discrete time state space model of the target system represented by the n-th order ordinary differential equation shown in Expression (8) can be represented by Expression (10). However, any of all the coefficients $a_0$ to $a_n$ in the n-th order ordinary differential equation shown in Expression (8) is non-zero. In addition, a state of the target system is to be represented by a combination of a certain observation amount y and a first order differential to an n-th order differential of the observation amount, and all of the first order differential to the n-th order differential of the observation amount are observable. Then, the inventor has found that, in this case, the determinant of the controllable matrix of the discrete time state space model represented by Expression (10) never becomes zero. That is, the inventor has found that the discrete time state space model represented by Expression (10) has controllability.

The inventor has made the invention shown below on the basis of the above-mentioned knowledge.

Hereinafter, an exemplary embodiment of the present invention will be described with reference to the drawings.

Figure 3:
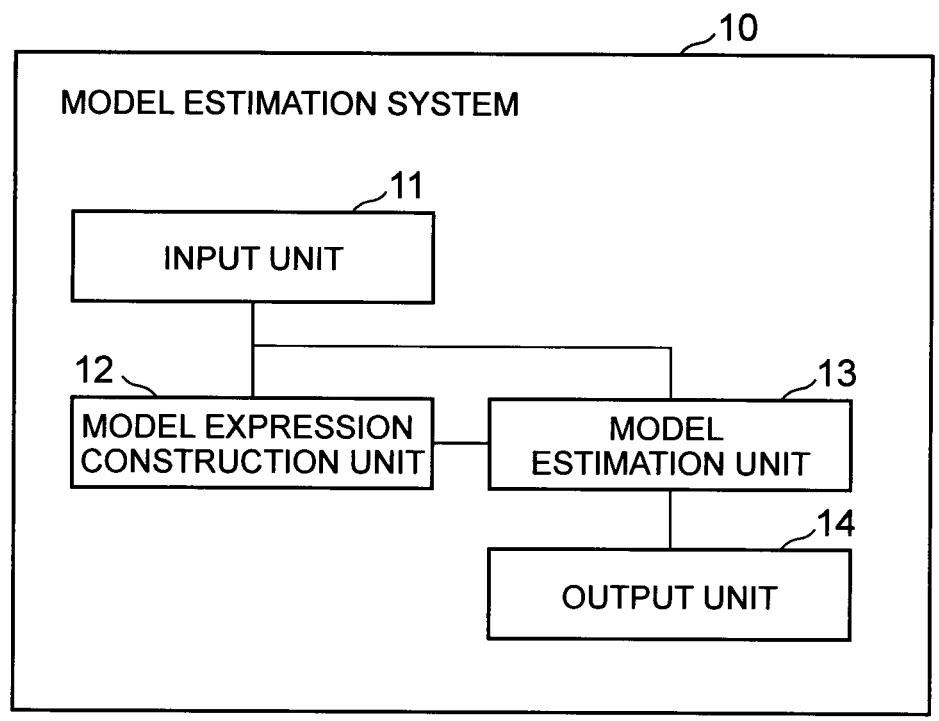
FIG. 3 It depicts a block diagram showing a configuration example of a model estimation system of the present invention.

FIG. 3 is a block diagram showing a configuration example of a model estimation system of the present invention. A model estimation system 10 of the present invention includes an input unit 11, a model expression construction unit 12, a model estimation unit 13, and an output unit 14.

The target system whose model is estimated by the model estimation system 10 is assumed to be a system that is represented by an ordinary differential equation with all coefficients being non-zero and with which input data and a state at each time can be obtained. The fact that a state at each time can be obtained means that the state at each time can be observed.

The order of the ordinary differential equation representing this target system is to be generalized and represented by n. That is, the ordinary differential equation representing the target system is to be represented by the above-mentioned Expression (8).

It is known that any of all the coefficients $a_0$ to $a_n$ shown in Expression (8) is non-zero. Meanwhile, as long as it is known that any of all the coefficients $a_0$ to $a_n$ is non-zero, the values themselves of all the individual coefficients $a_0$ to $a_n$ shown in Expression (8) may be unknown.

Further, a state of the target system is represented by a combination of a certain observation amount y and a first order differential to an n-th order differential of the observation amount. Therefore, a state $x_k$ of the target system at a certain time k is represented as $x_k = [y_k, y_k^{(1)}, \ldots, y_k^{(n)}]^T$. Similarly, a state $x_{k+1}$ of the target system at a time k+1 is represented as $x_{k+1} = [y_{k+1}, y_{k+1}^{(1)}, \ldots, y_{k+1}^{(n)}]^T$.

Further, the model estimation system 10 estimates a discrete time state space model as a model of the target system.

The input unit 11 is an input apparatus to input information on the ordinary differential equation representing the target system, and input data and a state of the target system at multiple past times. For example, the input unit 11 is a data reading device to read information on the ordinary differential equation representing the target system, and input data and a state at multiple past times of the target system, from a data recording medium such as an optical disk. In this case, a user of the model estimation system 10 may simply store information on the ordinary differential equation representing the target system, and input data and a state of the target system at multiple past times in advance in the data recording medium. Further, the input unit 11 is not limited to such a data reading device. The input unit 11 may be an input device for the user of the model estimation system 10 to input information on the ordinary differential equation representing the target system, and input data and a state of the target system at multiple past times.

The input unit 11 reads, as information on the ordinary differential equation representing the target system, the order of the ordinary differential equation and information that all the coefficients of the ordinary differential equation (all the coefficients $a_0$ to $a_n$ shown in Expression (8)) are non-zero, from the data storage medium. Note that, when the order of the ordinary differential equation is n, the number of coefficients of the ordinary differential equation is n+1.

Further, the input unit 11 reads input data and a state at multiple consecutive past times in the target system, from the data recording medium. Meanwhile, time is associated with the input data and the state. Further, an interval between consecutive times is constant.

The input unit 11 sends, to the model expression construction unit 12, the order of the ordinary differential equation representing the target system, and information that all the coefficients of the ordinary differential equation are non-zero. Further, the input unit 11 sends input data and a state at multiple consecutive past times in the target system to each of the model expression construction unit 12 and the model estimation unit 13.

When the order of the ordinary differential equation representing the target system, the information that all coefficients of the ordinary differential equation are non-zero, and the input data and the state at multiple consecutive past times in the target system are sent, the model expression construction unit 12 constructs an expression representing a model for predicting a state of the target system at a next time from input data and a state of the target system at one time. At this time, the model expression construction unit 12 determines a first matrix that is a matrix according to the order of the ordinary differential equation representing the target system and has only some elements as unknown elements, and a second matrix that is a matrix according to the order of the ordinary differential equation representing the target system and has only some element as an unknown element. Furthermore, the model expression construction unit 12 constructs an expression representing a discrete time state space model, by using the first matrix and the second matrix.

Specifically, the model expression construction unit 12 constructs the above-mentioned Expression (10). Expression (10) is an expression representing a discrete time state space model for predicting a state $x_{k+1}$ of the target system at a next time, from input data $u_k$ and a state $x_k$ of the target system at a time k. In the target system, since the state can be treated as output data, the discrete time state space model can be represented by Expression (10), while neglecting $y_k = Cx_k + v_k$ in Expression (1). Expression (10) shows an ideal case where there is no prediction error $w_k$ of the state.

The matrix A in Expression (10) corresponds to the first matrix, and the matrix B in Expression (10) corresponds to the second matrix. As described above, i represents the number when the rows of the matrix are counted from the top.

The model expression construction unit 12 may determine the matrix A (first matrix) as follows. When the order of the ordinary differential equation is n, the model expression construction unit 12 determines the matrix A (first matrix) as a matrix of n+1 rows and n+1 columns. Further, the model expression construction unit 12 calculates a constant $\Delta t$ indicating a time period from one time to the next time by calculating a difference between times associated with the input data and a state at multiple consecutive times in the target system (more specifically, a difference between two consecutive times). In the matrix A, in each row other than i=n+1 (that is, each row other than the last row), the model expression construction unit 12 sets an i-th element from the left to 1, an (i+1)-th element from the left to $\Delta t$, and remaining elements to 0. For example, in the first row (i=1), the model expression construction unit 12 sets a first element from the left to 1, a second element from the left to $\Delta t$, and remaining elements to 0 (see Expression (10)). Further, in the matrix A, in the last row (i=n+1), the model expression construction unit 12 sets an i-th (that is, (n+1)-th) element from the left to 0, and remaining elements to unknown elements $b_0$ to $b_{n-1}$ (see Expression (10)).

Further, the model expression construction unit 12 may determine the matrix B (second matrix) as follows. When the order of the ordinary differential equation is n, the model expression construction unit 12 determines the matrix B (second matrix) as a matrix of n+1 rows and one column. In the matrix B, the model expression construction unit 12 sets an element of the last row (i=n+1) as an unknown element $c_n$, and all elements of the first to n-th rows each to 0 (see Expression (10)).

The model expression construction unit 12 determines the matrices A and B as described above, and constructs Expression (10) with: a state $x_k = [y_k, y_k^{(1)}, \ldots, y_k^{(n)}]^T$ of the target system at a time k; input data $u_k$ to target system at a time k; and a state $x_{k+1} = [y_{k+1}, y_{k-1}^{(1)}, \ldots, y_{k+1}^{(n)}]^T$ of the target system at a next time k+1, as variables.

The model expression construction unit 12 sends the constructed expression to the model estimation unit 13.

Note that, at the time when the model expression construction unit 12 constructs Expression (10), the discrete time state space model of the target system has not been estimated since each of the matrices A and B contains an unknown element.

In addition, the model expression construction unit 12 may perform the above processing on the assumption that all the coefficients of the ordinary differential equation representing the target system are non-zero. That is, on the assumption that all the coefficients of the ordinary differential equation are non-zero, the input unit 11 may omit the reading of the information that all the coefficients of the ordinary differential equation are non-zero. Then, even if the information that all the coefficients of the ordinary differential equation are non-zero is not sent, the model expression construction unit 12 may perform the above-described processing as long as the order of the ordinary differential equation and input data and a state at multiple consecutive past times in the target system are sent from the input unit 11.

The model estimation unit 13 uses input data and a state at multiple consecutive past times in the target system, to estimate: the discrete time state space model of the target system by learning the unknown elements $b_0$ to $b_{n-1}$ of the matrix A (first matrix) in the expression constructed by the model expression construction unit 12; and the unknown element $c_n$ of the matrix B (second matrix) in the expression.

Input data and a state in the past in the target system are input data and a state at times 1 to N. The model estimation unit 13 obtains Expression (13) shown below by substituting input data $u_1$ and a state $x_1$ at the time 1 and a state $x_2$ at the time$_2$, into an expression constructed by the model expression construction unit 12.

$$x_2 = Ax_1 + Bu_1 \quad (13)$$

In Expression (13), $x_2$, $x_1$, and $u_1$ are specific values sent from the input unit 11. Meanwhile, the matrices A and B in Expression (13) are the matrices A and B determined by the model expression construction unit 12.

The model estimation unit 13 obtains a similar expression by substituting input data and a state at a certain time and a state at a next time into the expression constructed by the model expression construction unit 12. Specifically, the model estimation unit 13 obtains a plurality of expressions shown below.

$$x_2 = Ax_1 + Bu_1$$
$$x_3 = Ax_2 + Bu_2$$
$$\vdots$$
$$x_N = Ax_{N-1} + Bu_{N-1}$$

The model estimation unit 13 obtains the following Expression (14) by putting together the above plurality of expressions. Note that $x_1$ to $x_N$ in Expression (14) are all column vectors.

$$[x_2 \, x_3 \ldots x_N] = A[x_1 \, x_2 \ldots x_{N-1}] + B[u_1 \, u_2 \ldots u_{N-1}] \quad (14)$$

By performing regression analysis on the unknown elements $b_0$ to $b_{n-1}$ of the last line of matrix A and the unknown element $c_n$ of the last line of matrix B in Expression (14), the model estimation unit 13 estimates each value of the unknown elements $b_0$ to $b_{n-1}$ of the last line of the matrix A and a value of the unknown element $c_n$ of the last line of the matrix B.

The model estimation unit 13 may simply estimate each value of the elements $b_0$ to $b_{n-1}$ and $c_n$ that minimize $|y_{k+1}^{(n)} - [b_0, \ldots, b_{n-1}, c_n][y_k, \ldots, y_k^{(n-1)}, u_k]^T|^2$ on the right side of Expression (15) shown below.

[Formula 5]

$$[b_0^*, \ldots, b_{n-1}^*, c_n^*]: \underset{b_0, \ldots, b_{n-1}, c_n}{\mathrm{argmin}} \quad (15)$$
$$\left\| y_{k+1}^{(n)} - [b_0, \ldots, b_{n-1}, c_n][y_k, \ldots, y_k^{(n-1)}, u_k]^T \right\|^2$$

The model estimation unit 13 substitutes each of the values of the elements $b_0$ to $b_{n-1}$ and $c_n$ estimated by regression analysis, into the elements $b_0$ to $b_{n-1}$ and $c_n$ in Expression (10) constructed by the model expression construction unit 12. As a result, all elements of matrices A and B in Expression (10) are determined. That is, by estimating a value of the unknown element in Expression (10) constructed by the model expression construction unit 12, the model estimation unit 13 estimates the discrete time state space model of the target system.

The output unit 14 outputs the discrete time state space model estimated by the model estimation unit 13. For example, the output unit 14 may display the discrete time state space model on a display device (not shown in FIG. 3) provided to the model estimation system 10. However, an aspect for the output unit 14 to output the estimated discrete time state space model is not particularly limited.

The model expression construction unit 12, the model estimation unit 13, and the output unit 14 are realized by, for example, a central processing unit (CPU) of a computer that operates in accordance with a model estimation program. In this case, the CPU may simply read a program from a program storage medium such as a program storage device (not shown in FIG. 3) of the computer, for example, and operate as the model expression construction unit 12, the model estimation unit 13, and the output unit 14 in accordance with the program. Further, the model expression construction unit 12, the model estimation unit 13, and the output unit 14 each may be realized by individual hardware.

In addition, the model estimation system 10 may have a configuration in which two or more physically separated devices are connected in a wired or wireless manner.

Figure 4:
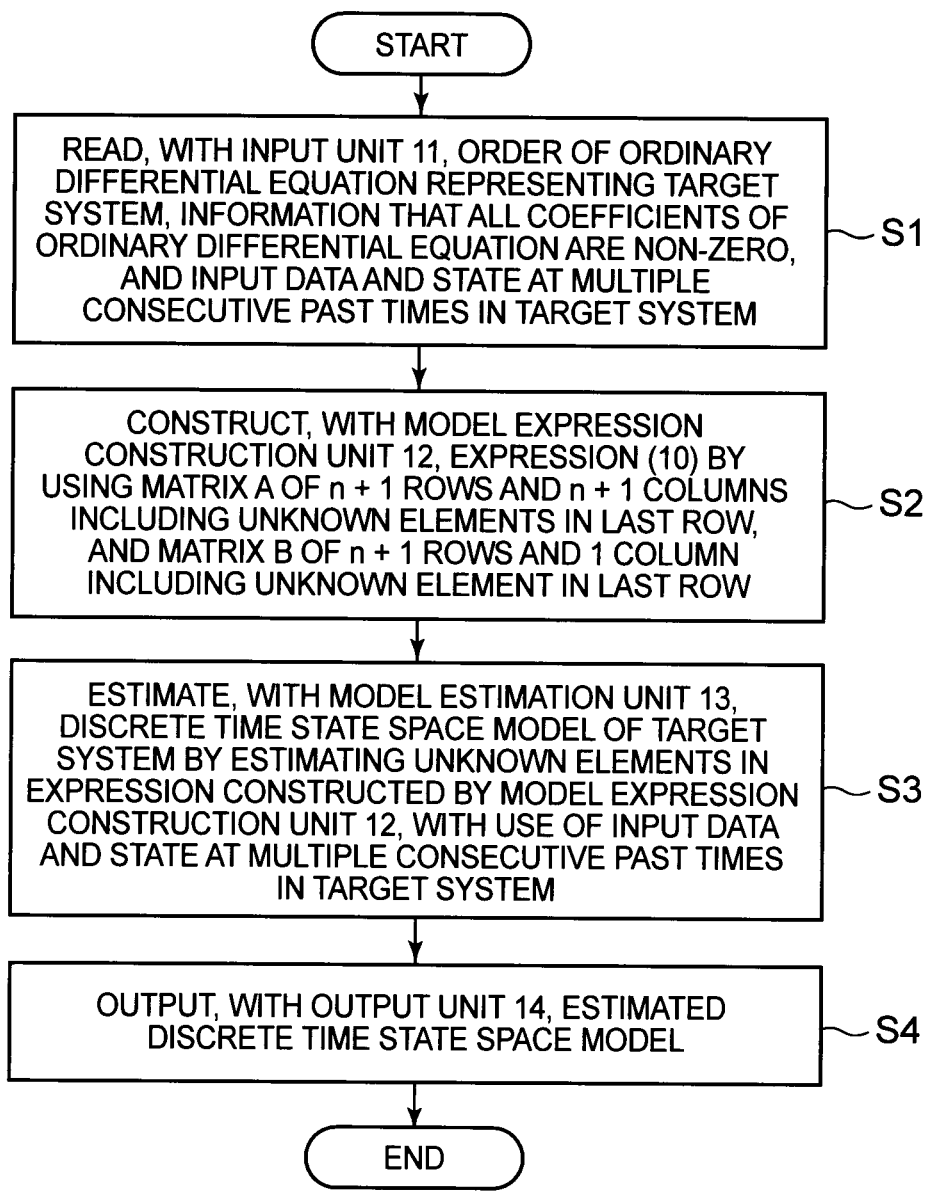
FIG. 4 It depicts a flowchart showing an example of a processing progress of the present invention.

Next, a processing progress of the present invention will be described. FIG. 4 is a flowchart showing an example of the processing progress of the present invention. Note that the description is appropriately omitted for operations similar to the operations already described.

First, the input unit 11 reads an order of the ordinary differential equation representing the target system, information that all coefficients of the ordinary differential equation are non-zero, and input data and a state at multiple consecutive past times in the target system (step S1). Hereinafter, the order of the ordinary differential equation representing the target system is defined as n.

The input unit 11 sends, to the model expression construction unit 12, the order of the ordinary differential equation representing the target system, and information that all the coefficients of the ordinary differential equation are non-zero. Further, the input unit 11 sends input data and a state at multiple consecutive past times in the target system to each of the model expression construction unit 12 and the model estimation unit 13.

Then, the model expression construction unit 12 uses a matrix A (first matrix) of n+1 rows and n+1 columns including an unknown element in the last row, and a matrix B (second matrix) of n+1 rows and one column including an unknown element in the last row, to construct Expression (10) (step S2). Expression (10) is an expression representing a discrete time state space model. As described above, the model expression construction unit 12 may simply calculate Δt in Expression (10) by calculating a difference between times associated with the input data and a state at multiple consecutive times in the target system (more specifically, a difference between two consecutive times).

The model expression construction unit 12 sends the constructed expression to the model estimation unit 13.

Next, the model estimation unit 13 estimates a discrete time state space model of the target system by estimating unknown elements ($b_0$ to $b_{n-1}$ and $c_n$ in Expression (10)) in the expression constructed by the model expression construction unit 12, with use of input data and a state at multiple consecutive past times in the target system (step S3).

Next, the output unit 14 outputs the discrete time state space model estimated in step S3 (step S4).

In the present invention, the target system is assumed to be a system that is represented by an ordinary differential equation with all coefficients being non-zero and with which input data and a state at each time can be obtained. Therefore, the discrete time state space model of the target system can be represented by Expression (10). In the present invention, the model expression construction unit 12 constructs Expression (10) in a state of including an unknown element. Furthermore, the model estimation unit 13 estimates the discrete time state space model of the target system by estimating a value of the unknown element with use of input data and a state at multiple consecutive past times in the target system. Thus, according to the present invention, the discrete time state space model of the target system can be estimated.

Furthermore, as found by the inventor, when all the coefficients of the ordinary differential equation of the target system (see Expression (8)) are non-zero, a determinant of the controllable matrix of the discrete time state space model represented by Expression (10) never becomes zero. The fact that the determinant of the controllable matrix is non-zero means that the discrete time state space model shown in Expression (10) has controllability. Therefore, the discrete time state space model estimated by the model estimation system 10 of the present invention has controllability. In other words, according to the present invention, a discrete time state space model having controllability can be estimated as the discrete time state space model of the target system.

This makes it possible to control the target system on the basis of the discrete time state space model estimated by the model estimation system 10 of the present invention.

Further, with the discrete time state space model, it is possible to obtain a state of the next time from a state and input data at a certain time.

The model estimation system according to the present invention can estimate a discrete time state space model having controllability. Therefore, the present invention is an invention in which a function and performance of a computer itself that estimates a model are improved. Further, the process of the model estimation system according to the present invention is not a simple mathematical process, but is a process of estimating a discrete time state space model for enabling control of a target system in the real world.

Figure 5:
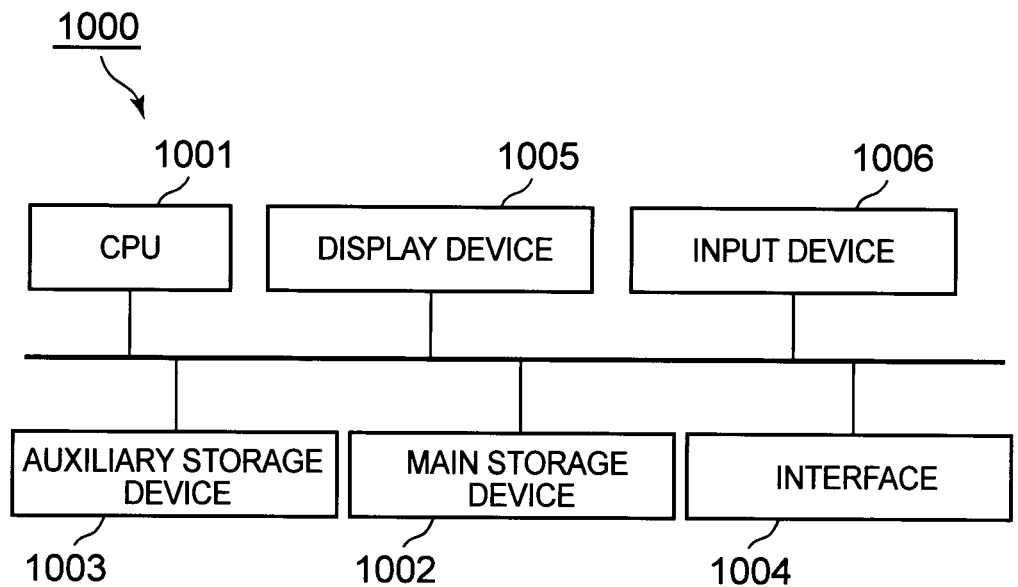
FIG. 5 It depicts a schematic block diagram showing a configuration example of a computer according to an exemplary embodiment of the present invention.

FIG. 5 is a schematic block diagram showing a configuration example of a computer according to an exemplary embodiment of the present invention. A computer 1000 includes a CPU 1001, a main storage device 1002, an auxiliary storage device 1003, an interface 1004, a display device 1005, and an input device 1006. In the example shown in FIG. 5, the input device 1006 corresponds to the input unit 11 (see FIG. 3). However, the computer 1000 only needs to include the input unit 11 corresponding to an input mode of information on the ordinary differential equation representing the target system, and of input data and a state at multiple past times of the target system.

The model estimation system 10 of the present invention is implemented in the computer 1000. An operation of the model estimation system 10 is stored in the auxiliary storage device 1003 in a form of a program (model estimation program). The CPU 1001 reads out the program from the auxiliary storage device 1003, develops the program in the main storage device 1002, and executes the above processing in accordance with the program.

The auxiliary storage device 1003 is an example of a non-transitory tangible medium. Other examples of non-transitory tangible medium include a magnetic disk, a magneto-optical disk, a CD-ROM, a DVD-ROM, a semiconductor memory, and the like, connected via the interface 1004. Further, in a case where this program is distributed to the computer 1000 by a communication line, the computer 1000 that has received the distribution may develop the program in the main storage device 1002 and execute the above processing.

Further, the program may be for realizing a part of the above-described processing. Furthermore, the program may be a differential program that realizes the above-described processing in combination with another program already stored in the auxiliary storage device 1003.

In addition, part or all of each constituent element may be realized by a general purpose or dedicated circuitry, a processor, or the like, or a combination thereof. These may be configured by a single chip or may be configured by a plurality of chips connected via a bus. Part or all of each constituent element may be realized by a combination of the above-described circuit and the like and a program.

When part or all of each constituent element is realized by a plurality of information processing devices, circuits, and the like, the plurality of information processing devices, circuits, and the like may be arranged concentratedly or distributedly. For example, the information processing devices, the circuits, and the like may be realized as a form in which each is connected via a communication network, such as a client and server system, a cloud computing system, and the like.

Figure 6:
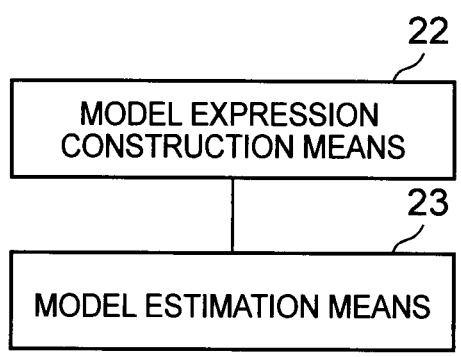
FIG. 6 It depicts is a block diagram showing an overview of the model estimation system of the present invention.

Next, an outline of the present invention will be described. FIG. 6 is a block diagram showing an overview of a model estimation system of the present invention. The model estimation system of the present invention includes a model expression construction means 22 and a model estimation means 23. Further, the model estimation system of the present invention estimates a model of the system that is represented by an ordinary differential equation with all the coefficients being non-zero, and with which input data and a state at each time can be obtained.

When an order of the ordinary differential equation and input data and a state at multiple past times in the system are inputted, the model expression construction means 22 (for example, the model expression construction unit 12) constructs an expression representing a model for predicting a state of the system at a next time from input data and a state of the system at one time, by using a first matrix that is a matrix according to the order and has only some elements as unknown elements and a second matrix that is a matrix according to the order and has only some element as an unknown element.

The model estimation means 23 (for example, the model estimation unit 13) uses input data and a state at multiple past times, to estimate a model by learning unknown elements of the first matrix and an unknown element of the second matrix in the expression.

Further, the model expression construction means 22 may be configured to construct an expression represented by the above Expression (10) having $b_0$ to $b_{n-1}$ and $c_n$ as unknown elements, with: an order of an ordinary differential equation as n; input data to the system at a time k as $u_k$; a state of the system at the time k as $[y_k, y_k^{(1)}, \ldots, y_k^{(n)}]^T$ (note that notation in superscript parenthesis indicates a differential order); a state of the system at a time k+1 following the time k as $[y_{k+1}, y_{k+1}^{(1)}, \ldots, y_{k+1}^{(n)}]^T$; and a time period from one time to the next time as $\Delta t$, while the model estimation means 23 may be configured to estimate $b_0$ to $b_{n-1}$ and $c_n$ in the expression by using input data and a state at multiple past times in the system.

Although the present invention has been described with reference to the exemplary embodiment above, the present invention is not limited to the above-described exemplary embodiment. Various changes that can be understood by those skilled in the art can be made to the configuration and details of the present invention within the scope of the present invention.

INDUSTRIAL APPLICABILITY

The present invention is suitably applied to a model estimation system that estimates a discrete time state space model of the system.

REFERENCE SIGNS LIST

10 Model estimation system
11 Input unit
12 Model expression construction unit
13 Model estimation unit
14 Output unit

The invention claimed is:

1. A model estimation system for estimating a model of a system that is represented by an ordinary differential equation with all coefficients being non-zero and allows input data and a state at each time to be obtained, the model estimation system comprising:
   at least one memory configured to store program instructions;
   at least one processor configured to execute the program instructions to implement:
      a model expression construction unit which constructs an expression representing a model for predicting a state of the system at a next time from input data and a state of the system at one time, when an order of the ordinary differential equation and input data and a state at multiple past times in the system are inputted, by using a first matrix that is a matrix according to the order and has only some elements as unknown elements and a second matrix that is a matrix according to the order and has only one element as an unknown element;
      a model estimation unit which estimates the model by machine learning unknown elements of the first matrix and an unknown element of the second matrix in the expression by using input data and a state at the multiple past times; and
      a model implementing unit which implements controllability of a target system based on transition from an initial state to a target state of the estimated model.

2. The model estimation system according to claim 1, wherein
   the model expression construction unit
   constructs an expression represented by Expression (16) having $b_0$ to $b_{n-1}$ and $c_n$ as unknown elements, with: an order of an ordinary differential equation as n; input data to the system at a time k as $u_k$; a state of the system at a time k as $[y_k, y_k^{(1)}, \ldots, y_k^{(n)}]^T$, wherein notation in superscript parenthesis indicates a differential order; a state of the system at a time k+1 following a time k as $[y_{k+1}, y_{k+1}^{(1)}, \ldots, y_{k+1}^{(n)}]^T$; and a time period from one time to a next time as $\Delta t$, and
   the model estimation unit
   estimates $b_0$ to $b_{n-1}$ and $c_n$ in the expression by using input data and a state at multiple past times in the system.

$$\begin{bmatrix} y_{k+1} \\ y_{k+1}^{(1)} \\ \vdots \\ y_{k+1}^{(n-1)} \\ y_{k+1}^{(n)} \end{bmatrix} = \begin{bmatrix} 1 & \Delta t & 0 & \ldots & 0 \\ 0 & 1 & \Delta t & \ldots & 0 \\ 0 & 0 & \ddots & \ddots & 0 \\ 0 & 0 & 0 & 1 & \Delta t \\ b_0 & b_1 & \ldots & b_{n-1} & 0 \end{bmatrix} \begin{bmatrix} y_k \\ y_k^{(1)} \\ \vdots \\ y_k^{(n-1)} \\ y_k^{(n)} \end{bmatrix} + \begin{bmatrix} 0 \\ 0 \\ \vdots \\ 0 \\ c_n \end{bmatrix} u_k. \quad (16)$$

3. A model estimation method for estimating a model of a system that is represented by an ordinary differential equation with all coefficients being non-zero and allows input data and a state at each time to be obtained, wherein
   a computer
   constructs an expression representing a model for predicting a state of the system at a next time from input data and a state of the system at one time, when an order of the ordinary differential equation and input data and a state at multiple past times in the system are inputted, by using a first matrix that is a matrix according to the order and has only some elements as unknown elements and a second matrix that is a matrix according to the order and has only one element as an unknown element; and
   estimates the model by machine learning unknown elements of the first matrix and the unknown element of the second matrix in the expression by using input data and a state at the multiple past times; and
   implements controllability of a target system based on transition from an initial state to a target state of the estimated model.

4. The model estimation method according to claim 3, wherein
   the computer
   constructs an expression represented by Expression (17) having $b_0$ to $b_{n-1}$ and $c_n$ as unknown elements, with: an order of an ordinary differential equation as n; input data to the system at a time k as $u_k$; a state of the system at a time k as $[y_k, y_k^{(1)}, \ldots, y_k^{(n)}]^T$, wherein notation in superscript parenthesis indicates a differential order; a state of the system at a time k+1 following a time k as $[y_{k+1}, y_{k+1}^{(1)}, \ldots, y_{k+1}^{(n)}]^T$; and a time period from one time to a next time as $\Delta t$, and
   estimates $b_0$ to $b_{n-1}$ and $c_n$ in the expression by using input data and a state at multiple past times in the system.

$$\begin{bmatrix} y_{k+1} \\ y_{k+1}^{(1)} \\ \vdots \\ y_{k+1}^{(n-1)} \\ y_{k+1}^{(n)} \end{bmatrix} = \begin{bmatrix} 1 & \Delta t & 0 & \ldots & 0 \\ 0 & 1 & \Delta t & \ldots & 0 \\ 0 & 0 & \ddots & \ddots & 0 \\ 0 & 0 & 0 & 1 & \Delta t \\ b_0 & b_1 & \ldots & b_{n-1} & 0 \end{bmatrix} \begin{bmatrix} y_k \\ y_k^{(1)} \\ \vdots \\ y_k^{(n-1)} \\ y_k^{(n)} \end{bmatrix} + \begin{bmatrix} 0 \\ 0 \\ \vdots \\ 0 \\ c_n \end{bmatrix} u_k. \quad (17)$$

5. A non-transitory computer-readable recording medium in which a model estimation program is recorded, the model estimation program causing a computer to estimate a model of a system that is represented by an ordinary differential equation with all coefficients being non-zero and allows input data and a state at each time to be obtained, the model estimation program causes
   the computer to execute:
      a model expression construction process of constructing an expression representing a model for predicting a state of the system at a next time from input data and a state of the system at one time, when an order of the ordinary differential equation and input data and a state at multiple past times in the system are inputted, by using a first matrix that is a matrix according to the order and has only some elements as unknown elements and a second matrix that is a matrix according to the order and has only one element as an unknown element;

a model estimation process of estimating the model by learning unknown elements of the first matrix and the unknown element of the second matrix in the expression by using input data and a state at the multiple past times; and an implementation process of implementing controllability of a target system based on transition from an initial state to a target state of the estimated model.

6. The non-transitory computer-readable recording medium according to claim 5, wherein the model estimation program causes the computer, in the model expression construction process, to construct an expression represented by Expression (18) having $b_0$ to $b_{n-1}$ and $c_n$ as unknown elements, with: an order of an ordinary differential equation as n; input data to the system at a time k as $u_k$; a state of the system at a time k as $[y_k, y_k^{(1)}, \ldots, y_k^{(n)}]^T$, wherein notation in superscript parenthesis indicates a differential order; a state of the system at a time k+1 following a time k as $[y_{k+1}, y_{k+1}^{(1)}, \ldots, y_{k+1}^{(n)}]^T$; and a time period from one time to a next time as $\Delta t$, and, in the model estimation process, to estimate $b_0$ to $b_{n-1}$ and $c_n$ in the expression by using input data and a state at multiple past times in the system $$\begin{bmatrix} y_{k+1} \\ y_{k+1}^{(1)} \\ \vdots \\ y_{k+1}^{(n-1)} \\ y_{k+1}^{(n)} \end{bmatrix} = \begin{bmatrix} 1 & \Delta t & 0 & \ldots & 0 \\ 0 & 1 & \Delta t & \ldots & 0 \\ 0 & 0 & \ddots & \ddots & 0 \\ 0 & 0 & 0 & 1 & \Delta t \\ b_0 & b_1 & \ldots & b_{n-1} & 0 \end{bmatrix} \begin{bmatrix} y_k \\ y_k^{(1)} \\ \vdots \\ y_k^{(n-1)} \\ y_k^{(n)} \end{bmatrix} + \begin{bmatrix} 0 \\ 0 \\ \vdots \\ 0 \\ c_n \end{bmatrix} u_k \quad (18)$$

* * * * *